(12) United States Patent
Mochizuki

(10) Patent No.: US 12,547,865 B2
(45) Date of Patent: Feb. 10, 2026

(54) UPDATING APPARATUS THAT UPDATES INFORMATION STORED IN STORAGE DEVICE, AND IMAGE FORMING APPARATUS

(71) Applicant: Canon Kabushiki Kaisha, Tokyo (JP)

(72) Inventor: Masataka Mochizuki, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 159 days.

(21) Appl. No.: 18/510,737

(22) Filed: Nov. 16, 2023

(65) Prior Publication Data

US 2024/0176973 A1    May 30, 2024

(30) Foreign Application Priority Data

Nov. 29, 2022  (JP) ................................. 2022-190574

(51) Int. Cl.
    *G06K 15/00*    (2006.01)
    *G06K 15/14*    (2006.01)
(52) U.S. Cl.
    CPC ......... *G06K 15/4075* (2013.01); *G06K 15/14* (2013.01)
(58) Field of Classification Search
    None
    See application file for complete search history.

(56) References Cited

U.S. PATENT DOCUMENTS

| | | | | |
|---|---|---|---|---|
| 2006/0034628 A1* | 2/2006 | Chihara | ............. | G03G 21/1882 399/27 |
| 2008/0273883 A1* | 11/2008 | Kim | ................... | G03G 15/0855 399/25 |
| 2023/0367250 A1* | 11/2023 | Kyotani | ............... | B41J 2/17566 |

FOREIGN PATENT DOCUMENTS

| | | |
|---|---|---|
| JP | 2000019803 A | 1/2000 |
| JP | 2005331539 A | 12/2005 |
| JP | 2015020315 A | 2/2015 |
| JP | 2022117333 A | 8/2022 |

OTHER PUBLICATIONS

Extended European Search Report issued Apr. 17, 2024 in counterpart European Patent Appln. No. 23206073.1.

* cited by examiner

*Primary Examiner* — Miya J Cato
(74) *Attorney, Agent, or Firm* — Venable LLP

(57) ABSTRACT

An updating apparatus that updates information stored in a storage device provided in a replacement unit of a predetermined apparatus includes: a control unit configured to, when initialization processing is started, read out usage information stored in a first region of the storage device and indicating a usage state of the replacement unit, perform backup processing of storing backup information based on the usage information in a target region within one or more second regions different from the first region, and perform update processing of updating the usage information stored in the first region to a first default value.

15 Claims, 9 Drawing Sheets

| ADDRESS | DETAIL | DEFAULT VALUE | |
|---|---|---|---|
| 01h | DATE OF MANUFACTURE | WHEN MANUFACTURED | REGION W |
| 02h | SERIAL NUMBER | SERIAL NUMBER | |
| 03h | MAXIMUM TRAVEL DISTANCE H OF DEVELOPING ROLLER | 60000[mm] | |
| 04h | NUMBER OF SHEETS PRINTED | 0[SHEET] | |
| 05h | TRAVEL DISTANCE G1 OF DEVELOPING ROLLER | 0[mm] | |
| ... | ... | ... | REGION X |
| 40h | TRAVEL DISTANCE G2 OF DEVELOPING ROLLER | 0[mm] | |
| 41h | TRAVEL DISTANCE G3 OF DEVELOPING ROLLER | 0[mm] | |
| ... | ... | ... | |
| 60h | REUSE IDENTIFICATION INFORMATION V1 | 0 | |
| 61h | REUSE IDENTIFICATION INFORMATION V2 | 0 | |
| ... | ... | ... | REGION Y |
| 70h | OUT-OF-TONER INFORMATION O1 | 0 | |
| 71h | OUT-OF-TONER INFORMATION O2 | 0 | |
| ... | ... | ... | |

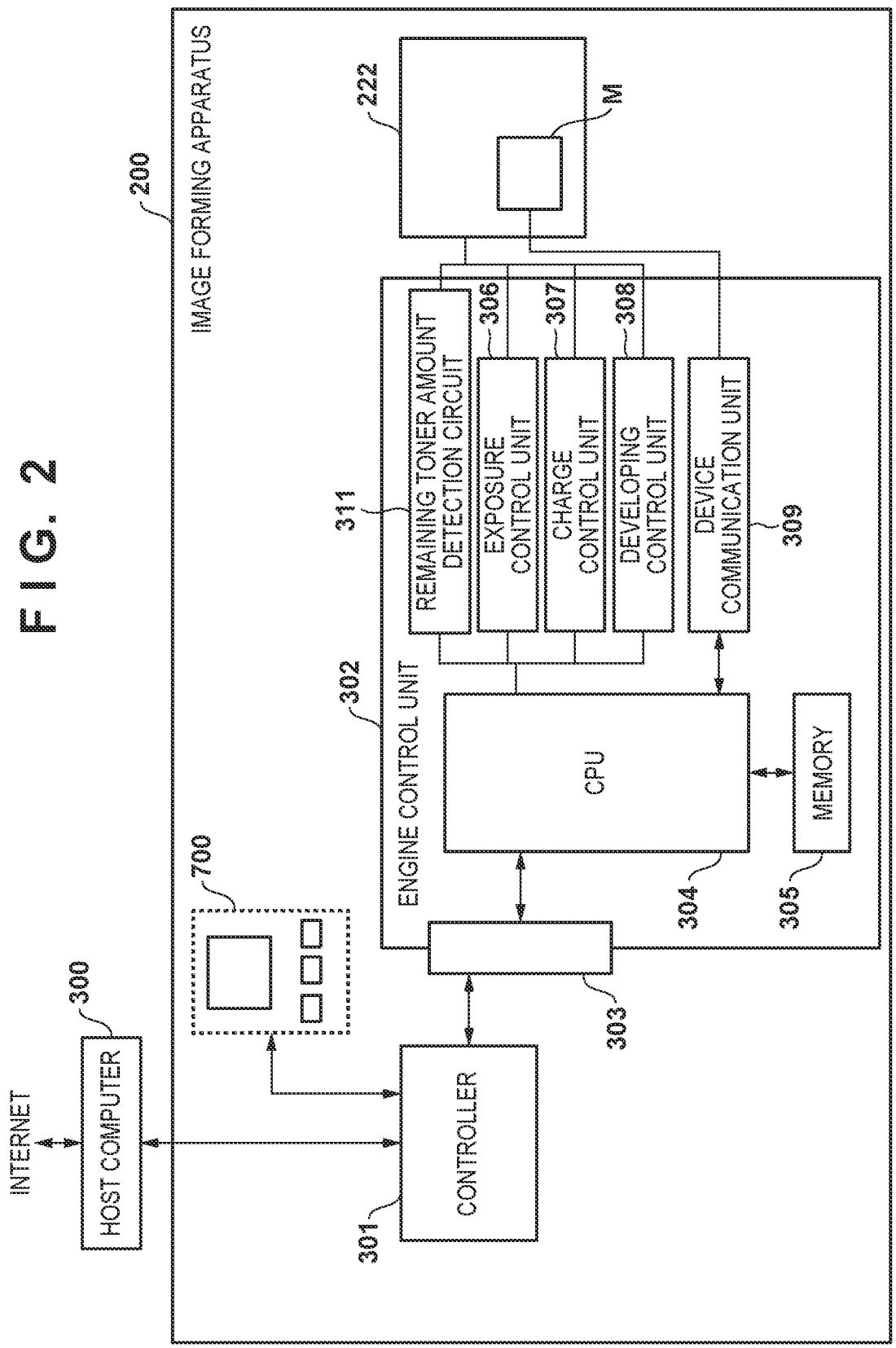

F I G. 3

| ADDRESS | DETAIL | DEFAULT VALUE | |
|---|---|---|---|
| 01h | DATE OF MANUFACTURE | WHEN MANUFACTURED | ⎫ REGION W |
| 02h | SERIAL NUMBER | SERIAL NUMBER | ⎭ |
| 03h | MAXIMUM TRAVEL DISTANCE H OF DEVELOPING ROLLER | 60000[mm] | ⎫ |
| 04h | NUMBER OF SHEETS PRINTED | 0[SHEET] | |
| 05h | TRAVEL DISTANCE G1 OF DEVELOPING ROLLER | 0[mm] | |
| ... | ... | ... | REGION X |
| 40h | TRAVEL DISTANCE G2 OF DEVELOPING ROLLER | 0[mm] | |
| 41h | TRAVEL DISTANCE G3 OF DEVELOPING ROLLER | 0[mm] | |
| ... | ... | ... | ⎭ |
| 60h | REUSE IDENTIFICATION INFORMATION V1 | 0 | ⎫ |
| 61h | REUSE IDENTIFICATION INFORMATION V2 | 0 | REGION Y |
| ... | ... | ... | ⎭ |

FIG. 4A

| ADDRESS | 05h | 40h | 41h | 60h | 61h |
|---|---|---|---|---|---|
| DETAIL | G1 | G2 | G3 | V1 | V2 |
| VALUE | 0 | 0 | 0 | 0 | 0 |

FIG. 4B

| ADDRESS | 05h | 40h | 41h | 60h | 61h |
|---|---|---|---|---|---|
| DETAIL | G1 | G2 | G3 | V1 | V2 |
| VALUE | D#1 | 0 | 0 | 0 | 0 |

FIG. 4C

| ADDRESS | 05h | 40h | 41h | 60h | 61h |
|---|---|---|---|---|---|
| DETAIL | G1 | G2 | G3 | V1 | V2 |
| VALUE | 0 | D#1 | 0 | 1 | 0 |

FIG. 4D

| ADDRESS | 05h | 40h | 41h | 60h | 61h |
|---|---|---|---|---|---|
| DETAIL | G1 | G2 | G3 | V1 | V2 |
| VALUE | D#2 | D#1 | 0 | 1 | 0 |

FIG. 4E

| ADDRESS | 05h | 40h | 41h | 60h | 61h |
|---|---|---|---|---|---|
| DETAIL | G1 | G2 | G3 | V1 | V2 |
| VALUE | 0 | D#1 | D#2 | 1 | 1 |

FIG. 4F

| ADDRESS | 05h | 40h | 41h | 60h | 61h |
|---|---|---|---|---|---|
| DETAIL | G1 | G2 | G3 | V1 | V2 |
| VALUE | D#3 | D#1 | D#2 | 1 | 1 |

FIG. 4G

| ADDRESS | 05h | 40h | 41h | 60h | 61h |
|---|---|---|---|---|---|
| DETAIL | G1 | G2 | G3 | V1 | V2 |
| VALUE | 0 | D#1 | D#3 | 1 | 1 |

FIG. 8

| ADDRESS | DETAIL | DEFAULT VALUE | |
|---|---|---|---|
| 01h | DATE OF MANUFACTURE | WHEN MANUFACTURED | REGION W |
| 02h | SERIAL NUMBER | SERIAL NUMBER | |
| 03h | MAXIMUM TRAVEL DISTANCE H OF DEVELOPING ROLLER | 60000[mm] | |
| 04h | NUMBER OF SHEETS PRINTED | 0[SHEET] | REGION X |
| 05h | TRAVEL DISTANCE G1 OF DEVELOPING ROLLER | 0[mm] | |
| ... | ... | ... | |
| 40h | TRAVEL DISTANCE G2 OF DEVELOPING ROLLER | 0[mm] | |
| 41h | TRAVEL DISTANCE G3 OF DEVELOPING ROLLER | 0[mm] | |
| ... | ... | ... | |
| 60h | REUSE IDENTIFICATION INFORMATION V1 | 0 | REGION Y |
| 61h | REUSE IDENTIFICATION INFORMATION V2 | 0 | |
| ... | ... | ... | |
| 70h | OUT-OF-TONER INFORMATION O1 | 0 | |
| 71h | OUT-OF-TONER INFORMATION O2 | 0 | |
| ... | ... | ... | |

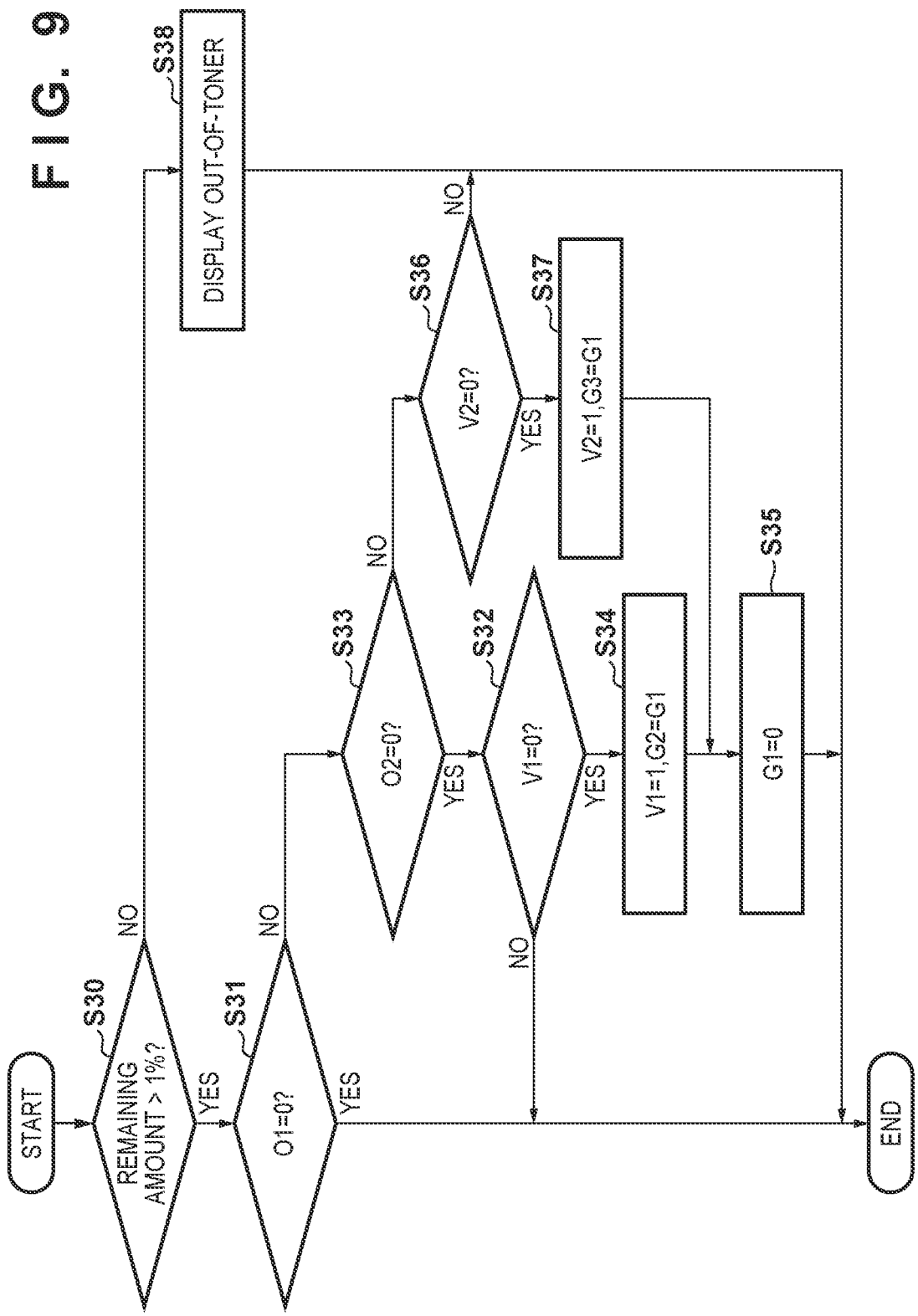

UPDATING APPARATUS THAT UPDATES INFORMATION STORED IN STORAGE DEVICE, AND IMAGE FORMING APPARATUS

BACKGROUND OF THE INVENTION

Field of the Invention

The present invention relates to a technique for updating information stored in a storage device provided in a replacement unit of an apparatus.

Description of the Related Art

An electrophotographic image forming apparatus exposes a charged photosensitive member with light to form an electrostatic latent image on the photosensitive member, and then develops the electrostatic latent image using a developing agent (toner) to form an image (a toner image) on the photosensitive member. The image forming apparatus then forms an image on recording material such as paper by directly transferring the image formed on the photosensitive member to the recording material, or by transferring the image to the recording material through an intermediate transfer member such as an intermediate transfer belt. The image forming apparatus is configured such that components/members having shorter lifespans than the main body of the image forming apparatus can be replaced. The image forming apparatus can also be configured such that consumables such as toner can be replenished or members containing consumables can be replaced. Note that it is also possible to configure the image forming apparatus such that instead of replacing individual components/members, a plurality of components/members are housed in a single enclosure and the enclosure is replaced as a unit. Such an enclosure is called a "process cartridge" or simply a "cartridge", for example. A unit configured to be removable from the main body of the image forming apparatus will be called a "replacement unit" in the following descriptions. The replacement unit is a unit for replacement, and includes at least one component/member used to form images.

Japanese Patent Laid-Open No. 2005-331539 discloses a configuration pertaining to the reuse of replacement units, which determines whether a component within a replacement unit can be used even after reuse. Japanese Patent Laid-Open No. 2015-020315 discloses a configuration for reusing replacement units having a storage device. According to Japanese Patent Laid-Open No. 2015-020315, a storage region of the storage device that stores usage information of the replacement unit, such as a printed material consumption amount, is changed with each reuse.

According to the configuration of Japanese Patent Laid-Open No. 2015-020315, the storage region that stores the usage information is changed with each reuse. As such, the replacement units which can be used with the image forming apparatus may be limited depending on the firmware version of the image forming apparatus. Note that such a problem is not limited to image forming apparatuses, and can arise in any apparatus that uses a replacement unit provided with the storage device and in which usage information of the replacement units is stored in the storage device.

SUMMARY OF THE INVENTION

The present invention provides a technique for suppressing situations where the replacement units that can be used in an apparatus are limited.

According to an aspect of the present disclosure, an updating apparatus that updates information stored in a storage device provided in a replacement unit of a predetermined apparatus, includes: a control unit configured to, when initialization processing is started, read out usage information stored in a first region of the storage device and indicating a usage state of the replacement unit, perform backup processing of storing backup information based on the usage information in a target region within one or more second regions different from the first region, and perform update processing of updating the usage information stored in the first region to a first default value.

Further features of the present invention will become apparent from the following description of exemplary embodiments with reference to the attached drawings.

BRIEF DESCRIPTION OF THE DRAWINGS

FIG. 2 is a control block diagram illustrating the image forming apparatus according to embodiments.

FIG. 3 is a diagram illustrating an example of information stored in a storage device according to embodiments.

FIGS. 4A to 4G are diagrams illustrating an example of the updating of the information stored in the storage device according to embodiments.

FIG. 8 is a diagram illustrating an example of information stored in the storage device according to embodiments.

FIG. 9 is a flowchart illustrating initialization processing according to embodiments.

DESCRIPTION OF THE EMBODIMENTS

Figure 1:
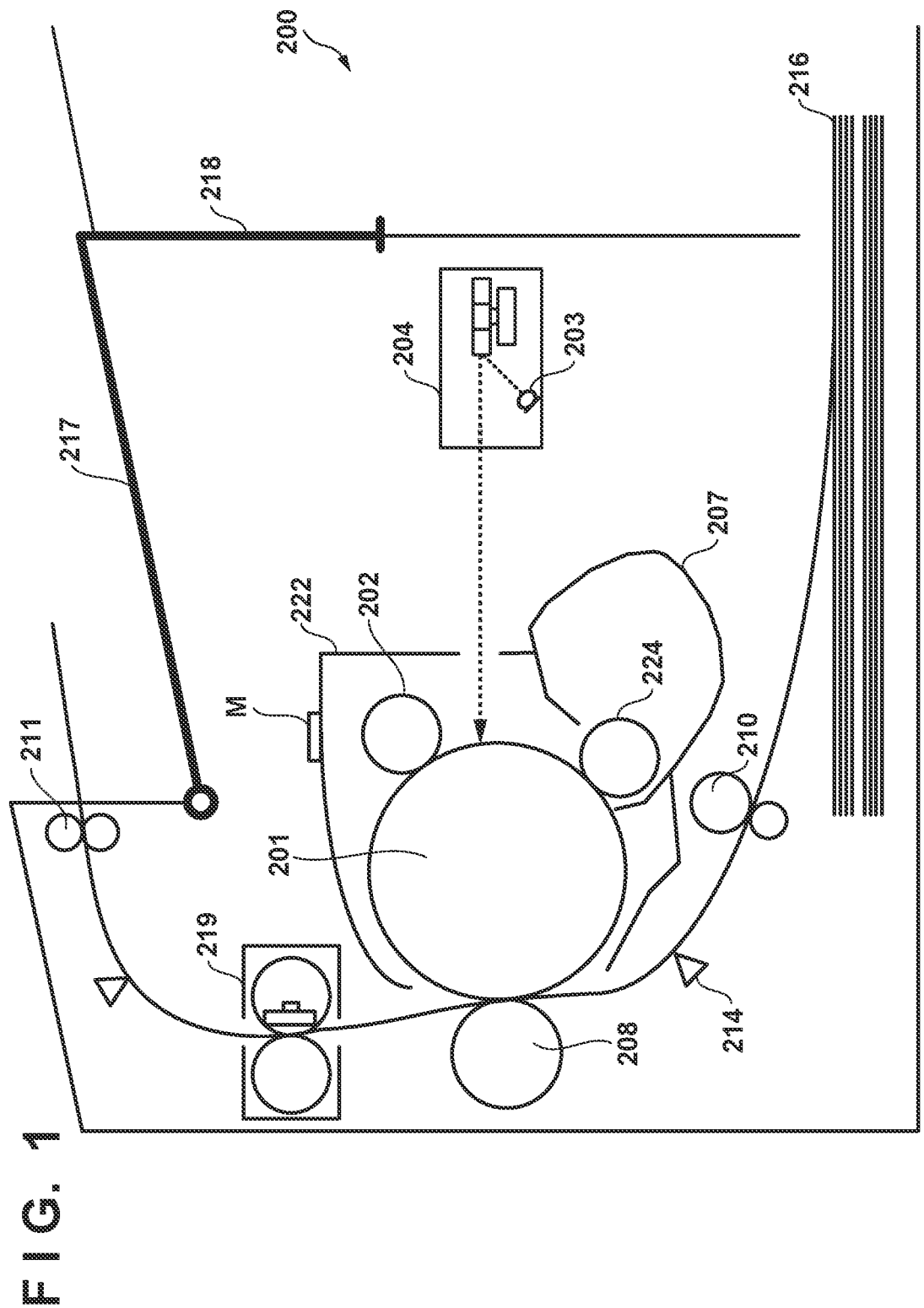
FIG. 1 is a block diagram illustrating an image forming apparatus according to embodiments.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

First Embodiment

FIG. 1 is a schematic cross-sectional view of an image forming apparatus 200 according to the present embodiment. A cartridge 222 is a replacement unit configured to be removable from the main body of the image forming apparatus 200. The cartridge 222 includes a photosensitive member 201, a charging roller 202, a developer 207, and a storage device M. During image formation, the photosensitive member 201 is rotationally driven in the clockwise direction in FIG. 1. The charging roller 202 charges the surface of the photosensitive member 201 to a uniform potential using a charging voltage. An exposure unit 204 exposes the charged photosensitive member 201 based on image data, and forms an electrostatic latent image on the photosensitive member 201. The exposure unit 204 includes a light source 203 that emits light. The developer 207 contains toner. A developing roller 224 of the developer 207 forms a toner image on the photosensitive member 201 by using a developing voltage to develop the electrostatic latent image on the photosensitive member 201 with the toner.

By the rotation of the photosensitive member 201, the toner image on the photosensitive member 201 is transported to a position opposite a transfer roller 208. Using a transfer voltage, the transfer roller 208 transfers the toner image on the photosensitive member 201 to a recording material 216 conveyed along a conveyance path. Note that rollers 210 feed the recording material 216 to the position opposite the transfer roller 208 while adjusting the timing such that the toner image on the photosensitive member 201 is transferred onto the recording material 216 based on the timing at which a sensor 214 detects the recording material 216. A fixing apparatus 219 heats and pressurizes the recording material 216 to fix the toner image to the recording material 216. After the toner image is fixed, the recording material 216 is discharged to a tray 217 by discharge rollers 211. A door 218 is provided in the main body of the image forming apparatus 200 such that the cartridge 222 can be removed from or attached to the main body of the image forming apparatus 200. A user of the image forming apparatus 200 replaces the cartridge 222 while the door 218 is opened.

FIG. 2 illustrates the control configuration of the image forming apparatus 200. The image forming apparatus 200 includes a controller 301 and an engine control unit 302. The controller 301 communicates with a host computer 300, which is an external apparatus. Upon receiving a print job from the host computer 300, the controller 301 causes the engine control unit 302 to form an image based on the print job. The controller 301 also controls a user interface unit 700 through which the user of the image forming apparatus 200 operates the image forming apparatus 200. The user of the image forming apparatus 200 can operate the image forming apparatus 200 by making various types of inputs through the user interface unit 700. Additionally, the controller 301 can display information pertaining to the state of the image forming apparatus 200 and the like in the user interface unit 700. Note that the host computer 300 can be connected to a network such as the Internet.

The engine control unit 302 forms an image by controlling the various members illustrated in FIG. 1 under the control of the controller 301. An interface unit 303 of the engine control unit 302 communicates with the controller 301. A central processing unit (CPU) 304 controls the engine control unit 302 as a whole. A memory 305 includes a non-volatile memory and a volatile memory. The memory 305 stores a control program executed by the CPU 304. The memory 305 is also used by the CPU 304 to store temporary data.

A remaining toner amount detection circuit 311 detects the amount of toner contained in the developer 207, i.e., a remaining toner amount. An exposure control unit 306 controls the exposure of the photosensitive member 201 by the exposure unit 204. A charge control unit 307 controls the charging voltage applied to the charging roller 202. A developing control unit 308 controls the developing voltage applied to the developing roller 224. A device communication unit 309 accesses the storage device M to read out or write (update) information under the control of the CPU 304.

In this manner, the CPU 304 and the device communication unit 309 function as an updating unit that updates information stored in the storage device M.

FIG. 3 illustrates the structure of data in a storage unit, which is provided in the storage device M and stores information, according to the present embodiment. The storage unit is a non-volatile memory, e.g., Electrically Erasable Programmable Read-Only Memory (EEPROM). Additionally, the storage unit is Non Volatile Random Access Memory (NVRAM), for example. Various types of information used by the image forming apparatus 200 are stored in the storage device M. Note that the default values of the information are stored in the storage unit of the storage device M when the cartridge 222 is shipped.

The storage regions of the storage device M may be classified into a plurality of regions W, X, and Y. The region W is a region in which information is prohibited from being changed. In other words, the region W is configured such that information can be read out therefrom by the engine control unit 302, but the information cannot be updated. As illustrated in FIG. 3, information which need not be changed from the default values, such as the date of manufacture, the serial number, and the like of the cartridge 222, is stored in the region W. Note than the address "03h" stores information indicating the maximum permitted travel distance H for the developing roller 224 (Hereinafter referred to as a "maximum travel distance H".). The travel distance of the developing roller 224 is the product of the total number of revolutions of the developing roller 224 and the circumference of the developing roller 224. According to FIG. 3, the developing roller 224 is determined to be at the end of its lifespan when the travel distance thereof reaches 60,000 mm.

The region X is a region where the stored information can be updated to any value within an allocated number of bits. The region X is configured such that information can be read out and updated by the engine control unit 302. The region X stores usage information indicating a usage state (usage status) of the cartridge 222, which changes depending on the execution of image formation processing and the like. For example, in FIG. 3, the address "04h" stores information indicating a number of sheets printed. When forming an image, the engine control unit 302 updates the value of the number of sheets printed by adding the number of sheets of the recording material 216 on which an image was formed to the number of sheets stored at the address "04h". Note that the default value of the number of sheets printed is 0. A travel distance G1 of the developing roller 224 is stored at the address "05h". When causing the developing roller 224 to rotate, the engine control unit 302 determines the travel distance of the developing roller 224 resulting from the rotation. The engine control unit 302 then updates the value of the travel distance G1 by adding the travel distance obtained to the travel distance stored at the address "05h". The default value of the travel distance G1 is 0. Although the following will describe an embodiment in which the travel distance G1 of the developing roller 224 is used as the usage information, other usage information can also be stored in the region X of the storage device M. The other usage information is, for example, the number of rotations and rotation time of the developing roller 224, the number of rotations, rotation time, travel distance, and the like of the photosensitive member 201, the amount of toner remaining, the amount of toner consumed, and the like. In other words, the usage information stored in the region X can be information related to the usage history of the cartridge 222 and/or members included in the cartridge 222.

The engine control unit 302 can determine the degree of deterioration of the developing roller 224 by dividing the value of the travel distance G1 by the maximum travel distance H. For example, if the travel distance G1 indicates 40,000, the degree of deterioration of the developing roller 224 is determined to be 40,000/60,000, or approximately 66%. In this example, a higher value for the degree of deterioration indicates a higher degree of deterioration. The engine control unit 302 controls the value of the developing voltage based on the degree of deterioration of the developing roller 224, for example. The information stored at the addresses "40h" and "41h" (travel distances G2 and G3 of the developing roller 224) will be described later.

The region Y is a region in which the information can be updated only once. The region Y is configured such that the value therein can be updated only once from the default value. The storage device M is configured such that the information stored in the region Y can always be read out. Specifically, reuse identification information V1 at the address "60h" is changed from a default value of "0" to "1" the first time the cartridge 222 is reused. Additionally, reuse identification information V2 at the address "61h" is changed from a default value of "0" to "1" the second time the cartridge 222 is reused.

Accordingly, the values of the reuse identification information V1 and V2 for a cartridge 222 the first time the cartridge is used after being manufactured, i.e., a cartridge 222 that has not yet been reused, are both "0". The value of the reuse identification information V1 is "1", and the value of the reuse identification information V2 is "0", for the cartridge 222 reused for the first time. Furthermore, the values of the reuse identification information V1 and V2 for the cartridge 222 reused two or more times are both "1". In this manner, the reuse identification information V1 and V2, as a whole, is also reuse count information that indicates the number of times the cartridge has been reused. Note that in the present embodiment, the reuse count that can be expressed by the reuse identification information V1 and V2 is a value from 0 to 2.

As described above, the storage device M is configured such that the information stored in the region W cannot be updated, while the information stored in the region Y can be updated only once. The storage device M is also configured such that the information in the region X can be updated to any desired value. The storage device M has a processor, for example. The processor is configured such that even if a command including a target address in the storage region and a value of information to be written to the target address is received from the device communication unit 309, the information is not written to the target address if the target address is an address within the region W. Additionally, the processor is configured such that if the target address is an address within the region Y and the information at the target address has been updated in the past, the information is not written to the target address. Instead of implementing the update limitation on the information of each region using the processor in the storage device M, the storage unit itself can be configured to satisfy the update limitation.

FIGS. 4A to 4G are explanatory diagrams illustrating values of the travel distances G1 to G3 of the developing roller 224 illustrated in FIG. 3, and of the reuse identification information V1 and V2. In the following descriptions, a cartridge 222 that has been reused L times will be referred to as "a cartridge at L reuses". Here, L is an integer greater than or equal to 0, and a cartridge 222 at 0 reuses is assumed to mean a cartridge which has not yet been reused after manufacture. The reuse count L is the value indicated by the reuse identification information V1 and V2, i.e., the reuse count information. FIG. 4A illustrates the information stored in the storage device M of a cartridge 222 that has been reused 0 times and has not yet been used. As illustrated in FIG. 4A, each piece of information is set to "0" as a default value. When rotating the developing roller 224, the engine control unit 302 updates the value of the travel distance G1 at the address "05h". FIG. 4B illustrates each piece of information when the cartridge 222 at 0 reuses is removed from the image forming apparatus 200 for replacement. According to FIG. 4B, the value of the travel distance G1 is D #1.

The cartridge 222 removed from the main body of the image forming apparatus 200 for replacement is sent to an entity that performs processing for reuse (called a "reuse operator" hereinafter). The reuse operator may be the same as the manufacturer of the cartridge 222, or may be different from the manufacturer of the cartridge 222. When the reuse operator performs the processing required for reuse, including replacing the developing roller 224 ("reuse processing" hereinafter), initialization processing is performed on the storage device M. Here, the initialization processing is performed for at least some of the usage information stored in the region X. The usage information subject to the initialization processing includes information related to the usage history of the cartridge 222 mentioned above. In the present embodiment, the usage information subject to the initialization processing is information pertaining to the travel distance of the developing roller 224, but other usage information stored in the region X may also be subject to the initialization processing. The cartridge 222 is set to the first reuse as a result of the initialization processing. FIG. 4C indicates the value of each piece of information after the first instance of the initialization processing. The value D #1 of the travel distance G1 is backed up to the address "40h" as the value of the travel distance G2 as a result of the initialization processing. The travel distance G1 is then updated to the default value of "0". The reuse identification information V1 is also updated from a value of "0" to a value of "1". In this manner, the initialization processing includes backup processing for the value of the travel distance G1 and update processing that updates the value of the travel distance G1 to the default value.

The cartridge 222 at a first reuse, which stores the information indicated in FIG. 4C, is then installed in the image forming apparatus 200 and reused. When rotating the developing roller 224, the engine control unit 302 updates the value of the travel distance G1 in the same manner as with the cartridge 222 at 0 reuses. FIG. 4D illustrates each piece of information when the cartridge 222 at a first reuse is removed from the image forming apparatus 200 for replacement. According to FIG. 4D, the value of the travel distance G1 is D #2.

When the reuse operator performs the reuse processing, including replacing the developing roller 224, for the cartridge 222 at a first reuse, the initialization processing is performed for the storage device M. FIG. 4E indicates the value of each piece of information after the second instance of the initialization processing. The value D #2 of the travel distance G1 is written to the address "41h" as the travel distance G3 as a result of the initialization processing. The travel distance G1 is then updated to the default value of "0". The reuse identification information V2 is also updated from a value of "0" to a value of "1".

The cartridge 222 at a second reuse, which stores the information indicated in FIG. 4E, is then installed in the image forming apparatus 200 and reused. When rotating the developing roller 224, the engine control unit 302 updates the value of the travel distance G1 in the same manner as with the cartridges at 0 reuses and at a first reuse. FIG. 4F illustrates each piece of information when the cartridge 222 at a second reuse is removed from the image forming apparatus 200 for replacement. According to FIG. 4F, the value of the travel distance G1 is D #3.

When the reuse operator performs the reuse processing, including replacing the developing roller 224, for the cartridge 222 at a second reuse, the initialization processing is performed for the storage device M. FIG. 4G indicates the value of each piece of information after the third instance of the initialization processing.

The value D #3 of the travel distance G1 is written to the address "41h" as the value of the travel distance G3 as a result of the initialization processing. The travel distance G1 is then updated to the default value of "0". Note that both the reuse identification information V1 and V2 have already been updated to values of "1", and thus the reuse identification information V1 and V2 are not updated in the third and subsequent instances of the initialization processing.

To summarize the processing illustrated in FIGS. 4A to 4G, the engine control unit 302 stores the current travel distance of the developing roller 224 as the value of the travel distance G1 at the address "05h" in the storage region, regardless of the number of reuses. The value of the travel distance G1 at the point in time when the cartridge 222 at 0 reuses stops being used is backed up in the storage device M as the value of the travel distance G2. Additionally, after a P-th reuse (where P is an integer of 2 or greater), the value of the travel distance G1 at the point in time when the cartridge 222 at (P−1) reuses stops being used is backed up in the storage device M as the value of the travel distance G3. Furthermore, in each instance of the initialization processing, the travel distance G1 is initialized to 0.

As described above, the engine control unit 302 determines the degree of deterioration of the developing roller 224 and controls the developing voltage based on the values of the travel distance G1 and maximum travel distance H. Accordingly, it is necessary to express the values of the travel distance G1 and the maximum travel distance H in bit lengths that ensure a resolution required to control the developing voltage. In the present embodiment, the travel distance G1 and the maximum travel distance H are expressed by 16 bits. Accordingly, the sizes of the storage regions at the address "05h" and the address "03h" are both 16 bits.

On the other hand, the value of the past travel distance G1 as the travel distances G2 and G3 is backed up to make it possible to determine the cause when the cartridge 222 is collected due to some problem. For example, members of the cartridge 222 which have long lifespans do not need to be replaced with each reuse. When such a member having a long lifespan causes a problem, the travel distances G2 and G3 can be used to estimate the usage period of the member based on the values of the travel distance G1 to the travel distance G3 and determine whether the problem occurred during a usage period shorter than the original lifespan of the member. Accordingly, there is no problem even if the values of the travel distances G2 and G3 are at a lower resolution than that of the value of the travel distance G1. For this reason, the values of the travel distance G2 and the travel distance G3 are expressed in 4 bits in the present embodiment. As such, the sizes of the storage regions for the addresses "40h" and "41h" are 4 bits.

As described above, in the present embodiment, the value of the travel distance G1 is expressed in 16 bits, and the values of the travel distances G2 and G3 are expressed in 4 bits, which is shorter than 16 bits. Accordingly, when backing up the value of the travel distance G1 as the value of the travel distance G2 or G3 during the initialization processing, quantization error will increase due to the difference in the number of bits. Specifically, in this example, the difference between the number of bits in the travel distance G1 (16 bits) and the number of bits in the travel distances G2 and G3 (4 bits) is 12 bits. Accordingly, the value to be written to the address "40h" or "41h" in the initialization processing is a value obtained by dividing the value stored at the address "05h" by $2^{12}=4{,}096$ and then rounding that value up, down, or off to the nearest whole number. For example, if the value stored as the travel distance G1 is 40,000, the degree of deterioration of the developing roller 224 is approximately 66%, as described above. On the other hand, if the initialization processing is performed when the value of the travel distance G1 is 40,000, the value backed up to the address "40h" or "41h" will be 9, which is the integer portion of the value obtained by dividing 40,000 by 4,096, assuming numbers below the decimal point are rounded down. Obtaining the travel distance from the backed-up value results in a travel distance of $4{,}096 \times 9 = 36{,}864$. Accordingly, the degree of deterioration determined from the backed-up value is $36{,}864/60{,}000 \approx 61\%$. In other words, quantization error of approximately 5% will arise in the degree of deterioration determined from the backed-up value.

However, this level of error is not a problem in determining the cause for the cartridge 222 collected due to some problem. On the other hand, making the size of the storage region at the address "40h" or "41h" smaller than the size of the storage region at the address "05h" makes it possible to reduce the size of the storage capacity required for the storage device M as a whole.

Furthermore, the firmware of the image forming apparatus 200 can be updated by the host computer 300 connected to the Internet to improve functionality, correct problems, and the like. Note that if the image forming apparatus 200 is configured to be capable of communicating directly with the Internet, the firmware update can be performed over the Internet. In the present embodiment, the travel distance of the developing roller 224 currently in use is always written to the address 05h, and thus situations where the cartridge 222 can no longer be used due to the firmware version of the image forming apparatus 200 can be suppressed.

Figure 5A:
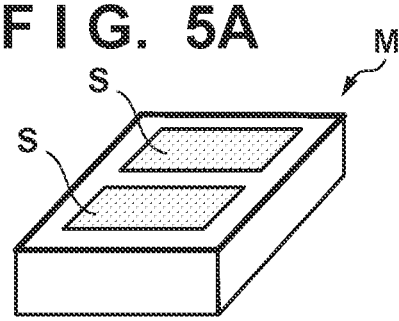
FIG. 5A is a diagram illustrating the storage device according to embodiments.
Figure 5B:
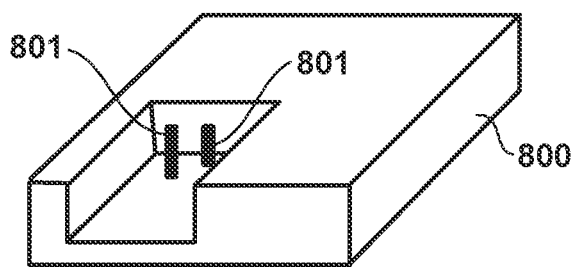
FIG. 5B is a diagram illustrating a processing apparatus according to embodiments.
Figure 5C:
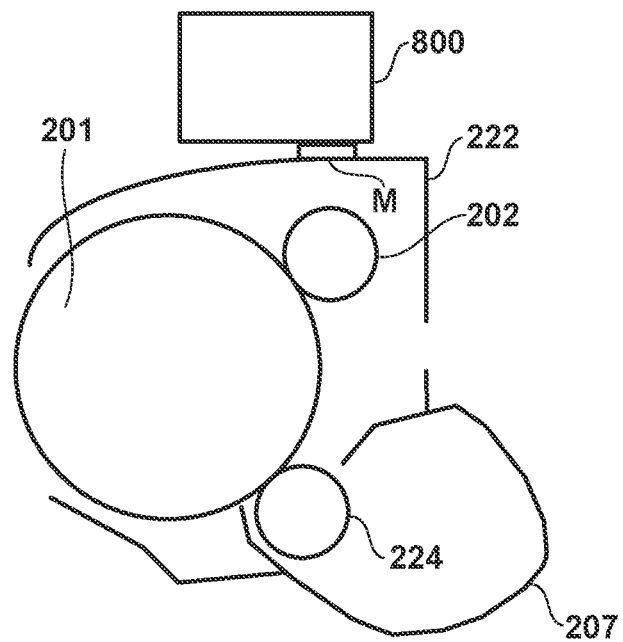
FIG. 5C is a diagram illustrating an example of the usage of the processing apparatus according to embodiments.

FIG. 5A is an exterior view of the storage device M. The storage device M has electrical contact points S. The main body part of the image forming apparatus 200 is configured such that when the cartridge 222 is mounted in the main body of the image forming apparatus 200, the electrical contact points S connect to signal lines from the device communication unit 309. FIG. 5B illustrates a processing apparatus 800 used by a reuse operator to perform the initialization processing on the storage device M. Like, for example, the engine control unit 302 of the image forming apparatus 200, the processing apparatus 800 includes a control unit having a CPU, a memory that stores programs executed by the CPU, and a device communication unit. Additionally, as illustrated in FIG. 5B, the processing apparatus 800 includes contact points 801 for accessing the storage device M via the contact points S of the storage device M. For example, as illustrated in FIG. 5C, bringing the contact points S of the storage device M of the cartridge 222 into contact with the contact points 801 of the processing apparatus 800 makes it possible for the device communication unit of the processing apparatus 800 to access the storage device M. The control unit of the processing apparatus 800 then starts executing the initialization processing described below in response to an initialization processing start button (not shown) provided in the processing apparatus 800 being pressed or the like.

Figure 6:
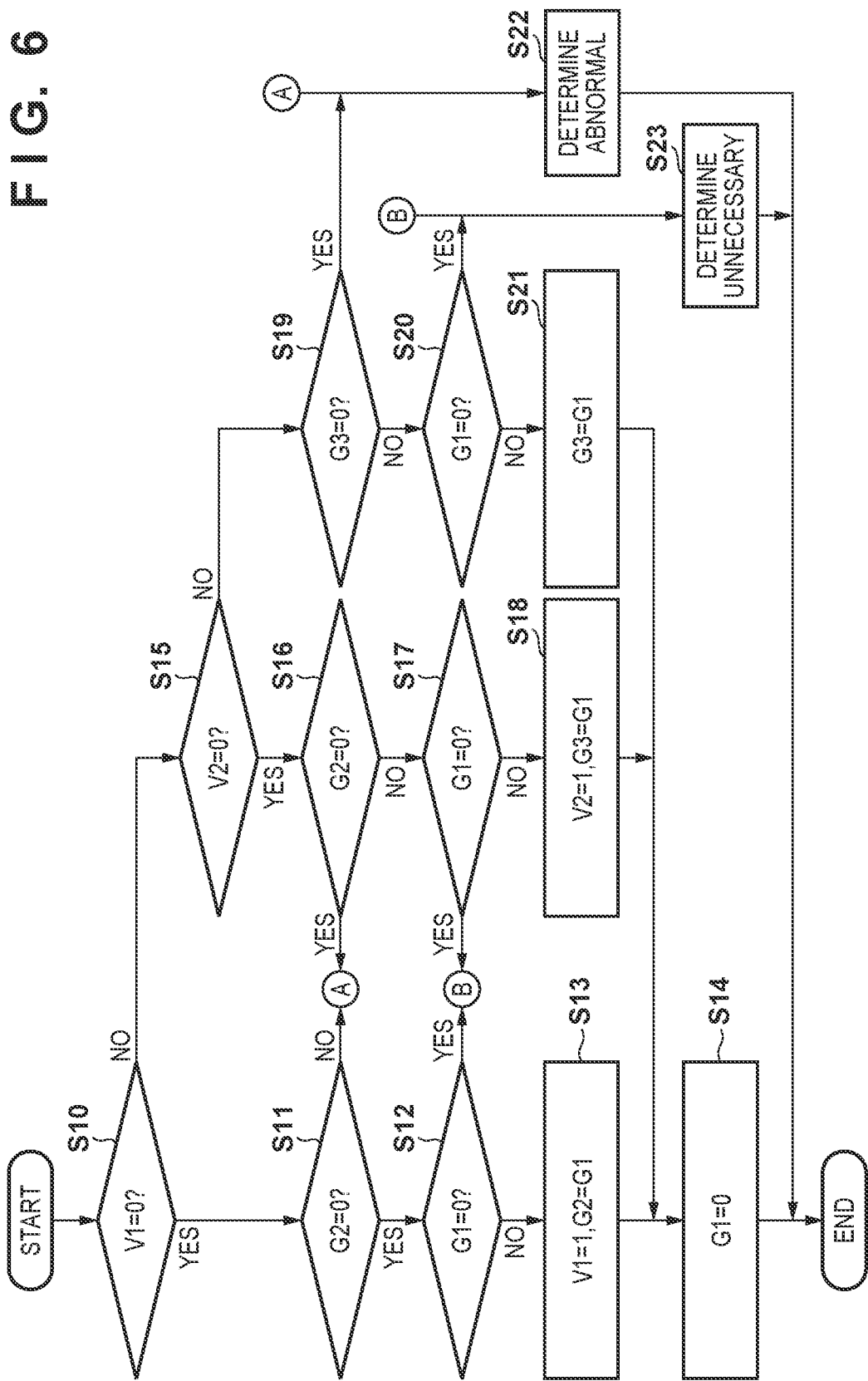
FIG. 6 is a flowchart illustrating initialization processing according to embodiments.

FIG. 6 is a flowchart illustrating the initialization processing executed by the processing apparatus 800 according to the present embodiment. In step S10, the processing apparatus 800 determines whether the reuse identification information V1 is 0. The reuse identification information V1 being 0 indicates a cartridge 222 at 0 reuses. If the reuse identification information V1 is 0, in step S11, the processing apparatus 800 determines whether the travel distance G2 is 0. The travel distance G2 of the cartridge 222 at 0 reuses is the default value of 0. Accordingly, if the travel distance G2 is not the default value of 0, in step S22, the processing apparatus 800 determines that the cartridge 222 is abnormal. In this case, the processing apparatus 800 makes a display indicating that the cartridge 222 is abnormal as well as the reason why the cartridge is abnormal, and then ends the processing illustrated in FIG. 6.

If the travel distance G2 is 0, in step S12, the processing apparatus 800 determines whether the travel distance G1 is 0. If the travel distance G1 is 0, the cartridge 222 is determined to be a new cartridge 222 which has not yet been used after being manufactured. Accordingly, if the travel distance G1 is 0, in step S23, the processing apparatus 800 determines that the initialization processing is unnecessary. In this case, the processing apparatus 800 makes a display indicating that the initialization processing is unnecessary as well as the reason why the initialization processing was determined to be unnecessary, and then ends the processing illustrated in FIG. 6. If the travel distance G1 is not 0, in step S13, the processing apparatus 800 sets the reuse identification information V1 to 1, and backs up the value of the travel distance G1 as the value of the travel distance G2. Note that at this time, the resolution is converted as described above. Then, in step S14, the processing apparatus 800 sets the travel distance G1 to the default value, which in this example is 0, and then ends the processing illustrated in FIG. 6.

On the other hand, if the reuse identification information V1 is 1 in step S10, in step S15, the processing apparatus 800 determines whether the reuse identification information V2 is 0. The reuse identification information V2 being 0 indicates a cartridge 222 at a first reuse. If the reuse identification information V2 is 0, in step S16, the processing apparatus 800 determines whether the travel distance G2 is 0. The value of the travel distance G2 of the cartridge 222 at a first reuse is set to a value aside from 0, which is the default value, as a result of the processing of step S13. Accordingly, if the travel distance G2 is 0, in step S22, the processing apparatus 800 determines that the cartridge 222 is abnormal. In this case, the processing apparatus 800 makes a display indicating that the cartridge 222 is abnormal as well as the reason why the cartridge is abnormal, and then ends the processing illustrated in FIG. 6.

If the travel distance G2 is not 0, in step S17, the processing apparatus 800 determines whether the travel distance G1 is 0. If the travel distance G1 is 0, the cartridge 222 is determined to be a cartridge 222 which has not yet been used after the first instance of the initialization processing. Accordingly, if the travel distance G1 is 0, in step S23, the processing apparatus 800 determines that the initialization processing is unnecessary. In this case, the processing apparatus 800 makes a display indicating that the initialization processing is unnecessary as well as the reason why the initialization processing was determined to be unnecessary, and then ends the processing illustrated in FIG. 6. If the travel distance G1 is not 0, in step S18, the processing apparatus 800 sets the reuse identification information V2 to 1, and backs up the value of the travel distance G1 as the value of the travel distance G3. Note that at this time, the resolution is converted as described above. Then, in step S14, the processing apparatus 800 sets the travel distance G1 to the default value, which in this example is 0, and then ends the processing illustrated in FIG. 6.

On the other hand, if the reuse identification information V2 is 1 in step S15, the processing apparatus 800 determines that the cartridge 222 is a cartridge 222 at a second or subsequent reuse. In this case, in step S19, the processing apparatus 800 determines whether the travel distance G3 is 0. The value of the travel distance G3 of a cartridge 222 at a second or subsequent reuse is a value aside from 0, which is the default value. Accordingly, if the travel distance G3 is 0, in step S22, the processing apparatus 800 determines that the cartridge 222 is abnormal. In this case, the processing apparatus 800 makes a display indicating that the cartridge 222 is abnormal as well as the reason why the cartridge is abnormal, and then ends the processing illustrated in FIG. 6.

If the travel distance G3 is not 0, in step S20, the processing apparatus 800 determines whether the travel distance G1 is 0. If the travel distance G1 is 0, the cartridge 222 is determined to be a cartridge 222 which has not yet been used after the initialization processing. Accordingly, if the travel distance G1 is 0, in step S23, the processing apparatus 800 determines that the initialization processing is unnecessary. In this case, the processing apparatus 800 makes a display indicating that the initialization processing is unnecessary as well as the reason why the initialization processing was determined to be unnecessary, and then ends the processing illustrated in FIG. 6. If the travel distance G1 is not 0, in step S21, the processing apparatus 800 backs up the value of the travel distance G1 as the value of the travel distance G3. Note that at this time, the resolution is converted as described above. Then, in step S14, the processing apparatus 800 sets the travel distance G1 to the default value, which in this example is 0, and then ends the processing illustrated in FIG. 6.

In the flowchart illustrated in FIG. 6, if the cartridge 222 is a cartridge 222 at a first reuse, it is determined whether the values of the travel distances G1 and G2 are the default values in steps S16 and S17, but the configuration can be such that whether the value of the travel distance G3 is the default value is determined as well. The value of the travel distance G3 of the cartridge 222 at a first reuse is the default value of 0. Accordingly, if the value of the travel distance G3 is not the default value, the cartridge 222 can be determined to be abnormal in step S22. Additionally, in the flowchart illustrated in FIG. 6, after the value of the travel distance G1 is backed up as the value of the travel distance G2 or G3, the value of the travel distance G1 is updated to the default value in step S14. However, the value of the travel distance G1 can also be updated to the default value before updating the value of the travel distance G2 or G3, as long as the value of the travel distance G1 has already been read out for backup.

As described above, usage information indicating a usage state of a replacement unit, such as the cartridge 222, is recorded in the same first region of the storage device M regardless of the number of reuses. By always storing the usage information indicating the usage state of the current replacement unit in the first region in this manner, situations where the cartridge 222 can no longer be used due to the firmware version of the image forming apparatus 200 can be suppressed.

Additionally, in the initialization processing performed in conduction with reuse operations of the replacement unit, the usage information stored in the first region is stored as backup information in a target region, which is one second region among one or more second regions which differ from the first region. In the present embodiment, the number of second regions is two, with addresses "40h" and "41h". The target region is determined based on the reuse count information. In the present embodiment, the reuse count information is indicated as a value from 0 to 2 by the two pieces of reuse identification information V1 and V2. In the above example, if the reuse count information is 0, the target region is at the address "40h", whereas if the reuse count information is 1, the target region is at the address "41h". If the reuse count information is 2, the target region is at the address "41h".

To express this more generally, the reuse count information can be said to indicate a number from 0 to N (where N is an integer of 1 or greater). In this case, there can be N number of second regions in which the backup information is stored. If N is 2 or greater, the target region is identified by the reuse count indicated by the reuse count information. In other words, if N is 2 or greater, each of the N second regions corresponds to one number indicated by the reuse count information. In order to indicate values from 0 to N as the reuse count, a configuration can be used in which, for example, N 1-bit regions are provided in the region Y, and N pieces of reuse identification information are stored therein. In other words, a configuration can be used in which the reuse count is expressed in N bits. In this case, the number of values of "1" in the N pieces of reuse identification information indicates the reuse count. Note that rather than expressing the reuse count as the number of values of "1", the reuse count can also be expressed as a binary number. In this case, the reuse count information stored in a single 2-bit region can express a reuse count from 0 to 3. Likewise, the reuse count information stored in a single 3-bit region can express a reuse count from 0 to 7. Note that when expressing the reuse count information as a binary number, the reuse count information is not stored in the region Y for which the values can be updated only once, and instead, a region Z in which the values can only be incremented is provided, and the reuse count information is stored in the region Z. Note that the reuse count information indicates the number of reuses, and this is the number of times the usage information, i.e., the value of the travel distance G1, was returned to its default value and the number of times the usage information was converted into backup information and backed up.

Additionally, a configuration can be used in which the bit length for expressing the backup information stored in the second region is shorter than the bit length for expressing the usage information stored in the first region. In other words, a configuration can be used in which the storage size of the second region is smaller than the storage size of the first region. This configuration makes it possible to store past usage information as backup information while suppressing an increase in the overall storage capacity of the storage device M. The backup information is not used to control image formation, e.g., to control the developing voltage in the embodiment, but is rather used to perform analysis when some problem occurs, and thus error produced by shortening the bit length is not a problem. Conversely, in the present embodiment, the usage information is stored in the first region regardless of the reuse count, which makes it possible to perform accurate control in accordance with the usage state of the replacement unit even for a replacement unit which has been reused, while also suppressing an increase in the overall storage capacity of the storage device M.

Additionally, inspecting the values in the usage information, the values in the backup region, and the like during the initialization processing makes it possible to determine whether the replacement unit is abnormal, whether initialization is necessary, and the like. For example, when an instruction to execute the initialization processing is made, whether initialization is necessary can be determined by inspecting the values and the usage information. This corresponds to the processing performed in steps S12, S17, and S20 in FIG. 6. Additionally, when the reuse count information does not indicate a maximum value, i.e., N times, the default value should be stored in the target region. As such, if the reuse count information does not indicate N times and the default value is not stored in the target region, the replacement unit can be determined to be abnormal. This corresponds to the processing performed in step S11 in FIG. 6. Additionally, if the reuse count information is a value aside from 0, the value in the target region, determined based on a number that is 1 less than the number indicated by the reuse count information, should be a value different from the default value. Accordingly, if the reuse count information is a value aside from 0, and the value in the target region, determined based on a number that is 1 less than the number indicated by the reuse count information, is the default value, the replacement unit can be determined to be abnormal. This corresponds to the processing performed in steps S16 and S19 in FIG. 6.

Second Embodiment

A second embodiment will be described next, focusing on the differences from the first embodiment. In the first embodiment, when the reuse operator performed the reuse processing, the initialization processing was performed using the processing apparatus 800. In the present embodiment, however, the image forming apparatus 200 executes the initialization processing. In other words, if an apparatus that executes the initialization processing and updates the information stored in the storage device M is taken as an updating apparatus, the updating apparatus is the processing apparatus 800 in the first embodiment, but is the image forming apparatus 200 in the present embodiment. In other words, in the first embodiment, the control unit of the processing apparatus 800 performed the initialization processing for the storage device M. On the other hand, in the second embodiment, the engine control unit 302 of the image forming apparatus 200 is the control unit that performs the initialization processing for the storage device M. In other words, the image forming apparatus 200 of the second embodiment can be said to include the processing apparatus 800.

After mounting a cartridge 222 subjected to reuse processing in the main body of the image forming apparatus 200, the user of the image forming apparatus 200 makes an input to start the execution of the initialization processing to the image forming apparatus 200 through the user interface unit 700. In response to this input, the engine control unit 302 starts the initialization processing. A flowchart of the initialization processing according to the present embodiment is similar to that of the first embodiment, illustrated in FIG. 6. However, "processing apparatus 800" in the descriptions of the flowchart illustrated in FIG. 6 is replaced with "engine control unit 302". Note that after mounting the cartridge 222 subjected to the reuse processing in the main body of the image forming apparatus 200, the user of the image forming apparatus 200 may make an input to start the execution of the initialization processing to the image forming apparatus 200 through the host computer 300 instead.

Third Embodiment

In the first embodiment and the second embodiment, the initialization processing was started in response to a user input instructing the initialization processing to be started being input to the updating apparatus. In the present embodiment, in addition to the initialization processing being started in response to a user input, the image forming apparatus 200 determines whether it is necessary to perform the initialization processing.

Figure 7:
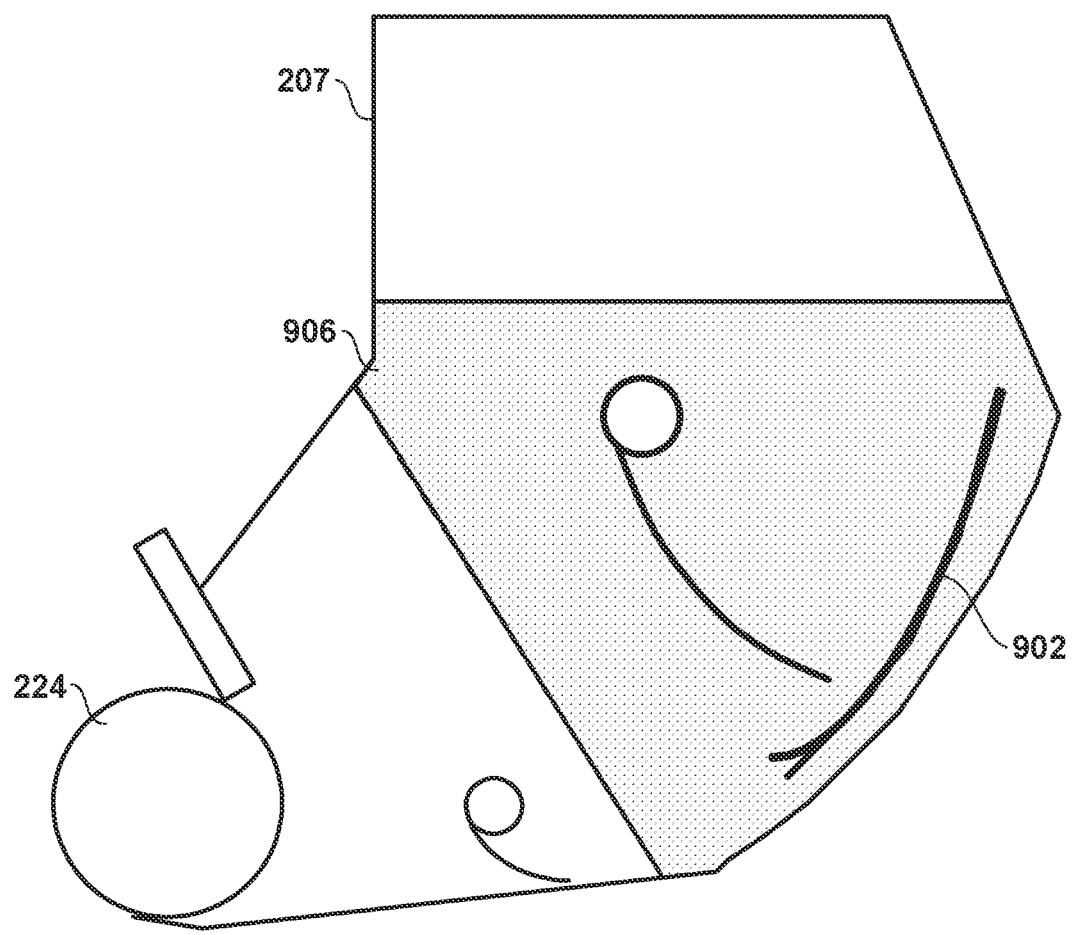
FIG. 7 is an explanatory diagram illustrating a remaining toner amount detection circuit according to embodiments.

FIG. 7 is a diagram illustrating a method for detecting a remaining toner amount, performed by the remaining toner amount detection circuit 311 indicated in FIG. 2. As illustrated in FIG. 7, a plate antenna 902 is provided within a holding container for toner 906. Although not illustrated, the plate antenna 902 is configured to be capable of being energized from the exterior. The potential of the plate antenna 902 varies in accordance with the developing voltage applied to the developing roller 224 and the remaining amount of toner 906 between the developing roller 224 and the plate antenna 902. The remaining amount of the toner 906 can therefore be detected by measuring the potential of the plate antenna 902.

FIG. 8 illustrates the structure of data in the storage device M according to the present embodiment. In the present embodiment, out-of-toner information O1 (address 70h) and out-of-toner information O2 (address 71h) are stored in the region Y. The default values of the out-of-toner information O1 and the out-of-toner information O2 are both 0. The out-of-toner information O1 is rewritten from 0 to 1 by the engine control unit 302 when the remaining toner amount detection circuit 311 detects that the cartridge 222 at 0 reuses is out of toner. Likewise, the out-of-toner information O2 is rewritten from 0 to 1 by the engine control unit 302 when the remaining toner amount detection circuit 311 detects that the cartridge 222 at a first reuse is out of toner. The remaining toner amount detection circuit 311 detects that the toner is out when the remaining toner amount goes from above a predetermined value to less than or equal to the predetermined value. The following descriptions will assume that the predetermined value for determining that the toner is out is 1%.

FIG. 9 is a flowchart illustrating the initialization processing performed by the engine control unit 302 of the image forming apparatus 200 according to the present embodiment. In the present embodiment, the engine control unit 302 starts the processing illustrated in FIG. 9 when the power of the image forming apparatus 200 is turned on and when the door 218 is changed from being open to closed. In other words, the engine control unit 302 starts the processing illustrated in FIG. 9 by detecting a state in which the cartridge 222 may have been replaced. In step S30, the engine control unit 302 determines whether the remaining toner amount is greater than 1%. If the remaining toner amount is less than or equal to 1%, the engine control unit 302 displays an indication that the apparatus is out of toner in step S38, and then ends the processing illustrated in FIG. 9. As described above, the out-of-toner information O1 and O2 are updated by the engine control unit 302 when the cartridge 222 is used and the remaining toner amount goes from greater than 1% to less than or equal to 1%, and thus in the processing illustrated in FIG. 9, which is started when the door is closed or when the power is turned on, there is no need to update the out-of-toner information O1 and O2. Although not illustrated in FIG. 9, if the cartridge 222 is not mounted, the engine control unit 302 makes a display indicating that the cartridge 222 is not mounted, and then ends the processing illustrated in FIG. 9.

If the remaining toner amount is greater than 1%, in step S31, the engine control unit 302 determines whether the out-of-toner information O1 is 0. If the out-of-toner information O1 is 0, the engine control unit 302 determines that a cartridge 222 for which the reuse number is 0 and has not yet run out of toner is mounted. Accordingly, in this case, the engine control unit 302 determines the initialization processing is unnecessary, and ends the processing illustrated in FIG. 9. On the other hand, if the out-of-toner information O1 is 1, in step S32, the engine control unit 302 determines whether the out-of-toner information O2 is 0.

If the out-of-toner information O2 is 0, the engine control unit 302 determines that a cartridge 222 at a first reuse is mounted. In this case, in step S33, the engine control unit 302 determines whether the reuse identification information V1 is 0. If the reuse identification information V1 is not 0, i.e., is 1, the engine control unit 302 determines that a cartridge 222 that has not yet run out of toner at the first reuse is mounted. Accordingly, in this case, the engine control unit 302 determines the initialization processing is unnecessary, and ends the processing illustrated in FIG. 9.

On the other hand, if the reuse identification information V1 is 0, the engine control unit 302 determines that a cartridge 222 which has undergone a first instance of reuse processing by the reuse operator, but has not yet undergone the first instance of the initialization processing, is mounted. Accordingly, in this case, in steps S34 and S35, the engine control unit 302 performs the initialization processing. Specifically, in step S34, the reuse identification information V1 is updated to 1 and the value of the travel distance G1 is backed up as the value of the travel distance G2, and in step S35, the travel distance G1 is initialized to 0.

On the other hand, in step S32, if the out-of-toner information O2 is 1, the engine control unit 302 determines that a cartridge 222 at a second or subsequent reuse is mounted. In this case, in step S36, the engine control unit 302 determines whether the reuse identification information V2 is 0. If the reuse identification information V2 is 0, the engine control unit 302 determines that a cartridge 222 which has undergone a second instance of reuse processing by the reuse operator, but has not yet undergone the second instance of the initialization processing, is mounted. Accordingly, in this case, in steps S37 and S35, the engine control unit 302 performs the initialization processing. Specifically, in step S37, the reuse identification information V2 is updated to 1 and the value of the travel distance G1 is backed up as the travel distance G3, and in step S35, the travel distance G1 is initialized to 0. On the other hand, if the reuse identification information V2 is 1 in step S36, the engine control unit 302 ends the processing illustrated in FIG. 9.

The out-of-toner information O1 and O2 in the present embodiment is also out-of-toner count information that indicates the number of times the toner has run out (called an "out-of-toner count" hereinafter) in a range from 0 to 2. Like the reuse count information (reuse identification information V1 and V2) described in the first embodiment, a configuration can also be used in which the out-of-toner count is indicated from 0 to N by N pieces of out-of-toner information. A configuration can also be used in which the out-of-toner count is indicated from 0 to N by expressing the out-of-toner count as a binary number. Here, in the present embodiment, both the reuse count information and the out-of-toner count information indicate the number of times from 0 to 2. Accordingly, in FIG. 9, whether the initialization processing is necessary for a cartridge 222 at a third or subsequent reuse is not determined. As such, it is necessary to perform the initialization processing based on a user instruction, in the manner described in the first embodiment, for a cartridge 222 at a third or subsequent reuse.

However, if whether the initialization processing is necessary for a cartridge 222 at a third or subsequent reuse is determined automatically, maximum values for the numbers indicated by the reuse count information and the out-of-toner count information (i.e., the value of N) may be set in accordance therewith. In other words, to automatically determine whether the initialization processing is necessary for a cartridge 222 up to an N-th reuse, the configuration may such that the reuse count information and the out-of-toner count information indicate a number from 0 to N. In this case, the engine control unit 302 starts executing the initialization processing when the amount of toner remaining is greater than the predetermined value and the number of reuses indicated by the reuse count information is 1 less than the out-of-toner count indicated by the out-of-toner count information. Note that the value of N can be set based on the maximum possible number of times the cartridge 222 can be reused, as determined, for example, based on components of the cartridge 222 that cannot be replaced.

The foregoing embodiments described the apparatus in which the replacement unit is mounted as an image forming apparatus. However, the present invention can be applied in any predetermined apparatus that uses a replacement unit and stores usage information indicating the usage state of the replacement unit in a storage device of the replacement unit. The specific numerical values in each of the foregoing embodiments are examples, and are not intended to limit the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-190574, filed Nov. 29, 2022, which is hereby incorporated by reference herein in its entirety.

What is claimed is:

1. An updating apparatus that updates information stored in a storage device provided in a replacement unit of an image forming apparatus, the updating apparatus comprising:
    one or more processors; and
    one or more memory devices storing a program that, when executed by the one or more processors, causes the one or more processors to:
    read out, when initialization processing is started, usage information stored in a first region of the storage device and indicating a usage state of the replacement unit,
    perform backup processing of storing backup information based on the usage information in a target region within a plurality of second regions of the storage device different from the first region, and
    perform update processing of updating the usage information stored in the first region to a first default value,
    wherein the one or more processors store count information based on a number of times the update processing has been performed in a third region different from the first region and the plurality of second regions, and
    the one or more processors determine the target region from among the plurality of second regions based on the count information.

2. The updating apparatus according to claim 1,
    wherein the usage information is information having a first bit length,
    the backup information is information having a second bit length shorter than the first bit length, and
    in the backup processing, the one or more processors convert the usage information of the first bit length into the backup information of the second bit length, and store the backup information in the target region.

3. The updating apparatus according to claim 1,
    wherein the count information indicates a number of 0 to N, where N is an integer of 2 or more, and
    the plurality of second regions are N second regions corresponding to the number indicated by the count information.

4. The updating apparatus according to claim 3,
    wherein the count information is N-bit information, and
    the third region includes N regions that store 1-bit information and for which information can be updated only once.

5. The updating apparatus according to claim 3,
    wherein when the count information indicates N, the one or more processors perform the backup processing and the update processing, but skip updating the count information.

6. The updating apparatus according to claim 3,
    wherein when the count information does not indicate N, and a second default value of the target region is not stored in the target region determined based on the number indicated by the count information, the one or more processors skip performing the backup processing and the update processing, and skip updating the count information.

7. The updating apparatus according to claim 3, wherein when the count information does not indicate 0, and a second default value of the target region is stored in the target region determined based on a number 1 less than the number indicated by the count information, the one or more processors skip performing the backup processing and the update processing, and skip updating the count information.

8. The updating apparatus according to claim 1, wherein when the first default value is stored in the first region, the one or more processors skip performing the backup processing, and skip updating the count information.

9. The updating apparatus according to claim 1, wherein the one or more processors start the initialization processing in response to a user input instructing the initialization processing to be executed.

10. The updating apparatus according to claim 1, wherein the image forming apparatus and the updating apparatus are different apparatuses.

11. The updating apparatus according to claim 1, wherein the image forming apparatus and the updating apparatus are a same apparatus.

12. An image forming apparatus that performs image formation by using a replacement unit comprising:
one or more processors; and
one or more memory devices storing a program that, when executed by the one or more processors, cause the one or more processors to:
read out, when initialization processing is started, usage information stored in a first region of a storage device of the replacement unit and indicating a usage state of the replacement unit,
perform backup processing of storing backup information based on the usage information in a target region within a plurality of second regions of the storage device different from the first region, and
perform update processing of updating the usage information stored in the first region to a first default value,
wherein the one or more processors store count information based on a number of times the update processing has been performed in a third region different from the first region and the plurality of second regions, and
the one or more processors determine the target region from among the plurality of second regions based on the count information.

13. The image forming apparatus according to claim 12, wherein the one or more processors update the usage information stored in the first region in accordance with the image formation.

14. The image forming apparatus according to claim 12, wherein the one or more processors control the image formation based on the usage information stored in the first region.

15. The image forming apparatus according to claim 12, wherein the replacement unit holds toner,
out-of-toner information indicating a number of times a remaining amount of the toner has dropped below a predetermined value is stored in the storage device by the one or more processors, and
the one or more processors start the initialization processing based on the remaining amount of the toner in the replacement unit, the count information, and the out-of-toner information.

* * * * *